(12) United States Patent
Hubin et al.

(10) Patent No.: US 8,942,543 B1
(45) Date of Patent: Jan. 27, 2015

(54) SYSTEMS, METHODS, AND SOFTWARE FOR IMPROVED VIDEO DATA RECOVERY EFFECTIVENESS

(75) Inventors: Mortimer Hubin, Laval (CA); Sylvain Ouellet, Laval (CA)

(73) Assignee: Verint Video Solutions Inc., Melville, NY (US)

( * ) Notice: Subject to any disclaimer, the term of this patent is extended or adjusted under 35 U.S.C. 154(b) by 19 days.

(21) Appl. No.: 13/253,802

(22) Filed: Oct. 5, 2011

Related U.S. Application Data

(60) Provisional application No. 61/390,446, filed on Oct. 6, 2010.

(51) Int. Cl.
*H04N 9/88* (2006.01)
*H04N 5/94* (2006.01)
*H04N 5/93* (2006.01)

(52) U.S. Cl.
USPC ........... 386/277; 386/270; 386/264; 386/286; 386/287

(58) Field of Classification Search
USPC .......................... 386/277, 270, 264, 286, 287
See application file for complete search history.

(56) References Cited

U.S. PATENT DOCUMENTS

| | | | |
|---|---|---|---|
| 6,895,486 B2 * | 5/2005 | Wong et al. ................... | 711/173 |
| 7,814,057 B2 * | 10/2010 | Kathuria et al. .............. | 707/646 |
| 8,073,047 B2 * | 12/2011 | Fallon et al. .................. | 375/240 |
| 2003/0004992 A1 * | 1/2003 | Matsui et al. ................. | 707/512 |
| 2006/0013085 A1 * | 1/2006 | Kelly et al. ................... | 369/47.1 |
| 2007/0171986 A1 * | 7/2007 | Hannuksela ............. | 375/240.26 |
| 2008/0101476 A1 * | 5/2008 | Tian et al. ................. | 375/240.26 |
| 2009/0094319 A1 * | 4/2009 | Lee et al. ....................... | 709/203 |
| 2010/0165830 A1 * | 7/2010 | Amir et al. .................... | 370/216 |
| 2011/0087721 A1 * | 4/2011 | Huang et al. .................. | 709/201 |
| 2011/0228795 A1 * | 9/2011 | Agrawal et al. ............... | 370/417 |

\* cited by examiner

*Primary Examiner* — Helen Shibru
(74) *Attorney, Agent, or Firm* — Meunier Carlin & Curfman

(57) ABSTRACT

Methods, systems, and software are provided herein that allow for storing a data file in a storage device. The storage system splits a video data file into a plurality of data segments, generates a plurality of recovery headers for the data segments, and combines ones of the recovery headers with ones of the data segments to form a plurality of storage packets.

20 Claims, 6 Drawing Sheets

SYSTEMS, METHODS, AND SOFTWARE FOR IMPROVED VIDEO DATA RECOVERY EFFECTIVENESS

RELATED APPLICATIONS

This patent application is related to and claims priority to U.S. Provisional Patent Application No. 61/390,446, entitled "Systems and Methods for Improving File Recovery Effectiveness," filed on Oct. 6, 2010, which is hereby incorporated by reference in its entirety.

TECHNICAL FIELD

Aspects of the disclosure are related to the field of video data storage and, and in particular, storing video data with file recovery information on digital storage systems.

TECHNICAL BACKGROUND

Information retention is one of the key functions of modern computing. Digital data is stored so it can be used or accessed again at some later point in time. There are many different storage technologies which are used for long term storage of data files including disk drives, flash memory, optical discs, tape drives, as well as others. Modern digital video processing systems use these types of storage mechanisms for the storage of video. In addition to other functions, the systems must manage the inventory of video which resides on a storage device as files are added, changed, deleted, or replaced.

Like most computer systems, many video processing systems typically make use of some type of file index to keep track of all the information pertaining to where files, and portions of files, are located on the storage device. A digital video file, like other computer files, may be split up when stored. The different pieces of the file may get stored in many different locations scattered across the storage device wherever unused space is available. Video processing systems typically use some sort of file index to be able to locate the various pieces of the video file in order to be able to reassemble the pieces correctly when the file is retrieved.

Computer systems and computer operating systems manage the inventory of information which resides on a storage device. In the ideal situation, the first data file written to a storage device starts at the first address location and the second data file written to the storage device starts at the address location immediately following the end of the first data file and the sequence repeats for subsequent data files. This simplistic system only works if data files are only written once and never changed, erased, or replaced. In reality, the distribution of data files across the storage device becomes much more complex after data files are changed, erased, or replaced. Video processing systems used to view and manipulate video data files operate in a similar manner and face similar challenges with respect to the management of data files.

When a data file is erased, an empty slot of storage space becomes available on the storage device. However, this slot is the size of the data file just erased and a new data file to be stored which is larger than the slot cannot be stored, in its entirety, in the slot. Similarly, a data file which was previously stored in a slot on the storage device and is now modified in a manner which makes the file bigger will no longer fit into its original storage slot. Some or all of the data file must now be relocated to another area of the storage device. For these reasons, as well as others, most rewritable storage devices are not sequentially populated with complete data files from beginning to end. The storage device eventually ends up being a continuously changing patchwork of used and unused storage locations.

This situation is further complicated by the fact that data files exist in all sizes and the patchwork of unused space on a storage device contains spaces of many different sizes. While it is ideal to store a data file in a single segment of contiguous storage space on the storage device, this is not always possible because the available slots of unused storage space are often smaller than the data file itself. Therefore, data files are often broken into segments when they are stored in order to make used of the smaller slots of unused storage space. There is a significant management task associated with keeping track not only of which data files are on the storage device and where those data files are located on the storage device but also keeping track of where each of the pieces of a data file resides if the data file has been broken into segments during the storage process.

Most computer systems and computer operating systems make use of some type of file index to keep track of all the information pertaining to where files, and portions of files, are located on the storage device. One type of file index which is commonly used is a file allocation table (FAT). A file index serves a function similar to that of a table of contents in providing detailed information about what data files currently reside in the storage device and where they are located. Because the data files may be scattered around the storage device in many different places and pieces, the file index is critical to finding data files on the storage device and retrieving them. Digital video files, like other computer files, may be split up and scattered around in a similar manner. A video processing system must also use some sort of file index to be able to locate and retrieve the various pieces of a video file and assemble them correctly.

In many systems, when a data file is erased the actual data bits of information on the storage device are not actually erased or overwritten. Instead, the reference to the data file is simply removed from the file index. Without the information about where the pieces of the data file are located, it is erased in the functional sense even though all of the bits of data still exist on the storage device. The actual data bits associated with the data file may only get changed or overwritten when that slot on the storage device is used to store a different data file. Similarly, formatting a storage device often only involves resetting or erasing the file index and the data files themselves are unchanged. However, these data files are virtually inaccessible because the file index, the map which explains where all the segments of data are and how they fit together, is gone.

A similar situation may result if some portion of a storage device is damaged, erased, corrupted, or no longer works properly. If any of these circumstances affect the file index or the tools which allow the file index to perform its function, it may appear that some or all of the data files have been erased. In reality, the data files may still exist on the storage device but they are inaccessible because the map to where the pieces of the data files are located within the storage device is damaged, corrupted, or erased.

In these situations, it is desirable to have another means of recovering and reconstructing data files which may still exist on the storage device. While the file index is effective as a single, centralized source of information regarding the organization of the data files on the storage device, it is also a central point of risk or failure which impacts all of the data on the storage device. For these reasons, it is desirable to also have information located with the data files or segments themselves which could aid in the reconstruction of the video data file if the file index could not be used.

Overview

Methods, systems, and software are provided herein that allow for storing a data file in a storage device. In a first example, a method of operating a storage system is disclosed. The method includes splitting a video data file into a plurality of data segments, generating a plurality of recovery headers for the data segments, and combining ones of the recovery headers with ones of the data segments to form a plurality of storage packets.

In a second example, a computer-readable medium having program instructions stored thereon for operating a storage system is disclosed. When executed by the storage system, the program instructions direct the storage system to split a video data file into a plurality of data segments, generate a plurality of recovery headers for the data segments, combine ones of the recovery headers with ones of the data segments to form a plurality of storage packets, locate empty slots on a storage device for the storage packets, and store the storage packets in the empty slots.

In another example, a storage system is disclosed. The storage system includes a processing system configured to split a video data file into a plurality of data segments, generate a plurality of recovery headers for the data segments, and combine ones of the recovery headers with ones of the data segments to form a plurality of storage packets, and locate empty slots on a storage device for the storage packets. The storage device is also configured to store the storage packets in the empty slots.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Provided herein are solutions that allow data files to be stored to storage systems which improves the ability to reconstruct the data files without the file index information. Information used to locate various pieces of a data file within a storage system and link the pieces back together to reconstruct a data file is typically available within a file index, such as a file allocation table (FAT). In the systems, methods, and software described herein, recovery information is included in a recovery header stored with each of a number of pieces of data files to assemble the associated data pieces together to form the data files without any information from a file index. Thus, it possible to reconstruct the data files even though an index file is missing, destroyed, or otherwise unusable.

Figure 1:
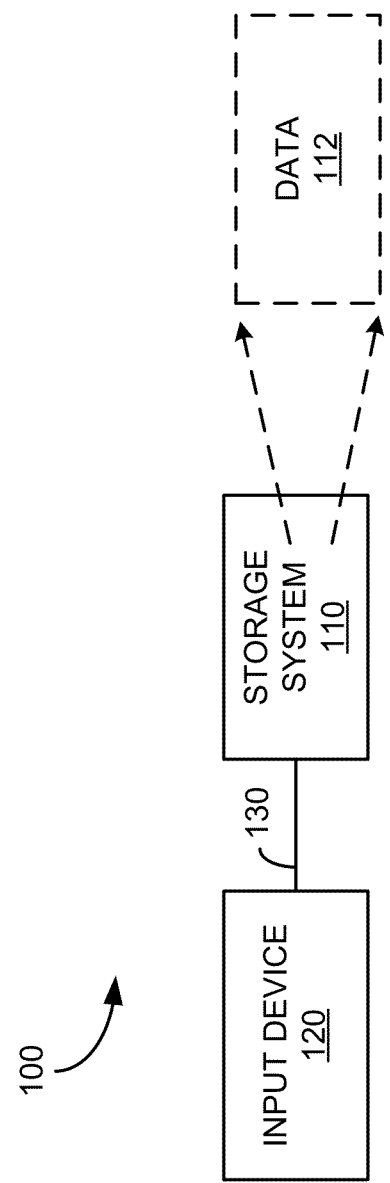
FIG. 1 is a system diagram illustrating system 100.

As a first example, FIG. 1 is a system diagram illustrating system 100. System 100 includes storage system 110 and input device 120. Storage system 110 and input device 120 communicate over link 130. Storage system 110 includes data 112. Storage system 110 can receive data files or other computer-readable data over link 130 for storage as data 112.

Figure 2:
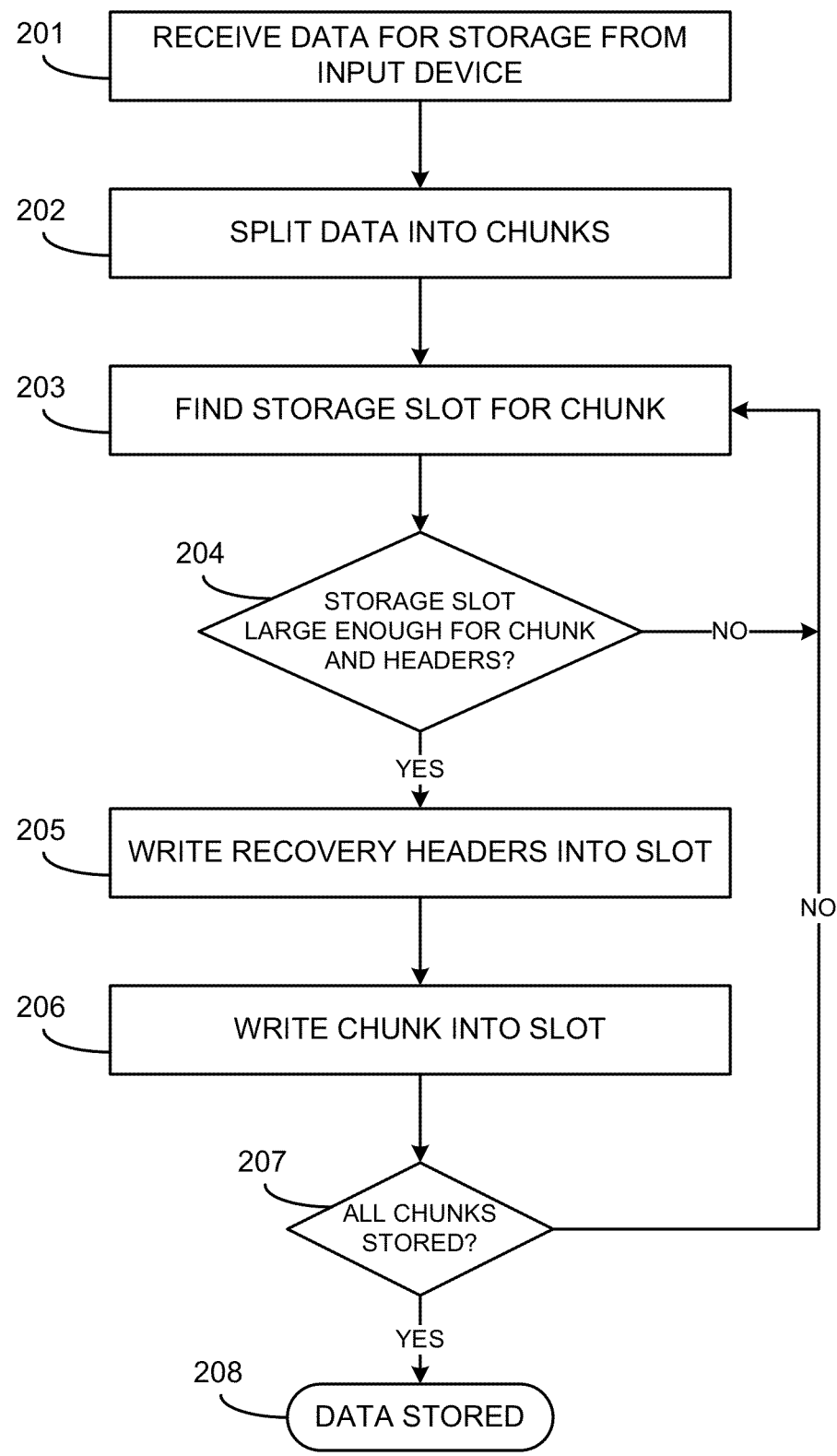
FIG. 2 is a flow diagram illustrating a method of operating a storage system.

FIG. 2 is a flow diagram illustrating a method of operation of storage system 110. The operations of FIG. 2 are referenced herein parenthetically. FIG. 2 illustrates a storage operation for storing data by storage system 110. In FIG. 2, storage system 110 receives (201) data for storage from input device 120. Storage system 110 splits (202) the data into segments. Storage system 110 finds (203) a storage slot for storage of the data, and determines (204) if the storage slot is large enough for the segment and recovery headers associated with the data. In some examples, the storage slot comprises an empty continuous physical block slot, such as a contiguous portion of a storage medium which can fit the segment and associated headers. If the storage slot is not large enough, storage system finds another storage slot. If the storage slot is large enough, then storage system 110 writes (205) recovery headers associated with the segment to the storage slot and writes (206) the segment to the storage slot. If further segments have yet to be stored (207), then storage system 110 finds (203) further storage slots for the further segments. However, if all of the segments of the data have been written (208), then the storage process concludes having stored the data.

Figure 3:
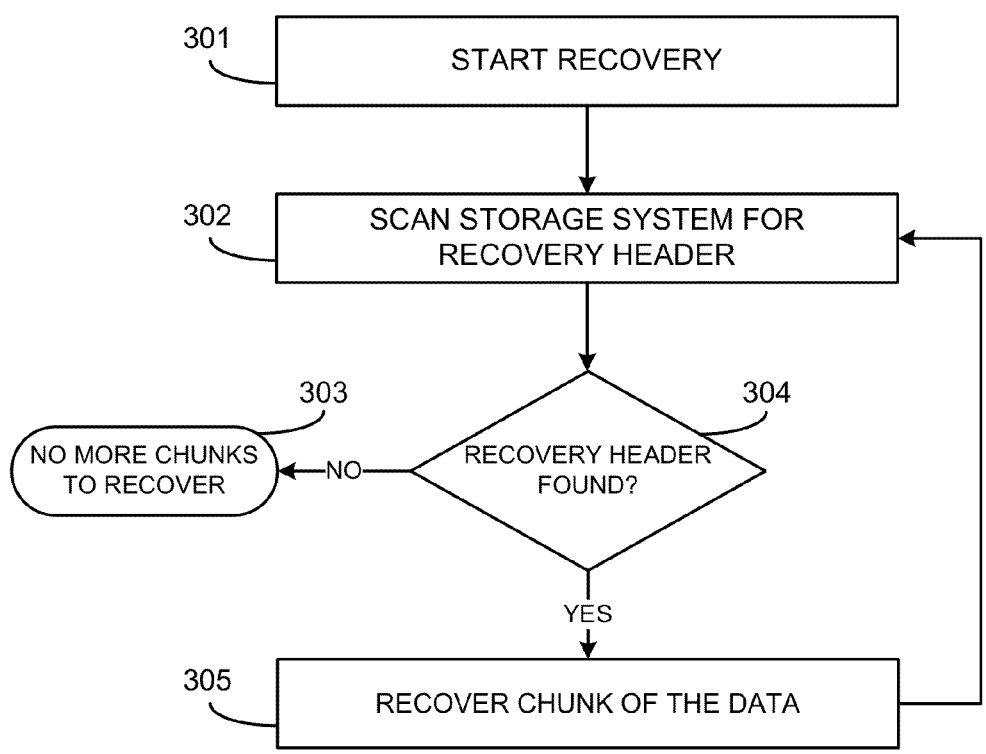
FIG. 3 is a flow diagram illustrating a method of operating a storage system.

FIG. 3 is a flow diagram illustrating a method of operation of storage system 110. The operations of FIG. 3 are referenced herein parenthetically. FIG. 3 illustrates a data recovery operation for retrieving data previously stored by storage system 110. In FIG. 3, a recovery is started (301) by storage system 110. The recovery operation could be initiated by a user of storage system 110, or in response to a data storage device or storage medium of storage system 110 being formatted or erased, among other operations. Storage system 110 scans (302) for a recovery header. If a recovery header is found (304), then storage system 110 recovers (305) a segment of the data previously stored. The process repeats as more segments of the data are found by scanning (302) and discovering (304) recovery headers until no more recovery headers are found (303). In further examples, the segments found associated with the recovery headers are reassembled into a data file or multiple data files.

Returning to the elements of FIG. 1, storage system 110 could comprise microprocessor and other circuitry that retrieves and executes operating software to operate as described herein. The operating software could include computer programs, applications, logs, firmware, or some other form of machine-readable processing instructions. When executed by storage system 110 the operating software directs storage system 110 to operate as described herein. Storage system 110 could also comprise a non-transitory computer-readable storage medium for storing data thereon. The computer-readable storage medium could comprise non-volatile memory, such as a hard disk drive, flash memory, phase change memory, magnetic memory, tape drive, servers, cloud storage systems, or other non-volatile memory. Storage system 110 also includes data 112, which could be stored on a computer-readable storage medium of storage system 110. Data 112 comprises the data transferred by input device 120, and could include associated segments and recovery headers.

Input device 120 could comprise a data source or data transfer system. Input device 120 could include data source systems, such as user input systems, multimedia capture devices, video capture devices, network systems, computer systems, end-user data systems, or other data source systems. Input device 120 could also include data transfer systems, such as transceivers, routers, switches, or other data transfer systems, including combinations thereof.

Figure 4:
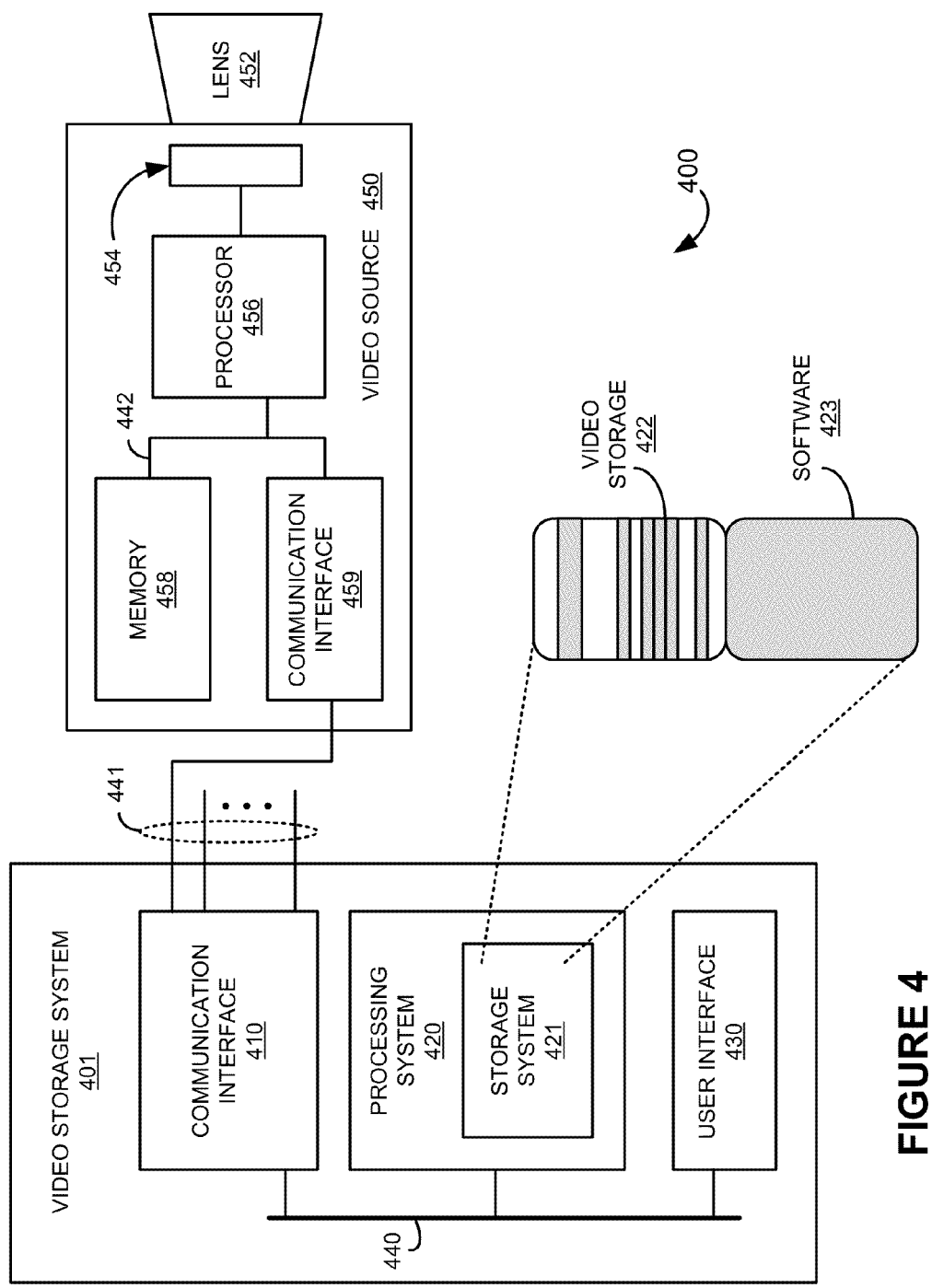
FIG. 4 is a system diagram illustrating system 400.

FIG. 4 is a system diagram illustrating system 400. System 400 includes video storage system 401 as an example of storage system 110 found in FIG. 1, although storage system 110 could use other configurations. System 400 also includes video source 450 as an example of input device 120 as found in FIG. 1, although other input devices could be employed. Video source 450 and video storage system 401 communicate over one of links 441. Further input devices, such as video sources, could be employed and configured to communicate over other ones of links 441.

Video storage system 401 includes communication interface 410, processing system 420, and user interface 430. Communication interface 410, processing system 420, and user interface 430 are shown to communicate over a common bus 440 for illustrative purposes. It should be understood that discrete links could be employed, such as data links, power links, video links, or other links. Video storage system 401 may be distributed among multiple devices that together form the elements of FIG. 4.

Communication interface 410 includes circuitry and equipment to receive and store video data or other data from a plurality of video sources over links 451. Communication interface 410 could comprise network interfaces, transceiver circuitry, buffers, video data processors, or other circuitry and equipment. In typical examples, communication interface 410 receives digital video from cameras in a digital format, such as MPEG, H.264, Flash, VP8, or JPEG video, and could include various packet formats such as IP packets or Ethernet, or other digital video and packet formats. Communication interface 410 could encode, transcode, compress, or encrypt the video into a digital format, or change a digital format of the video to a different format. In further examples, communication interface 410 receives analog video from cameras in an analog format, such as NTSC, PAL, or other analog video format, and encodes the analog video into a digital format for storage. In some examples, portions of functionality mentioned above for communication interface 410 are handled in processing system 420. Links 441 could use various protocols or communication formats as described herein for link 130, and could include Ethernet, Internet protocol (IP), video, digital, packet, or other links and protocols, including combinations, variations, or improvements thereof.

Processing system 420 includes storage system 421. Processing system 420 retrieves and executes software 423 from storage system 221. In some examples, processing system 420 is located within the same equipment in which communication interface 410 or user interface 423 are located. In further examples, processing system 420 comprises specialized circuitry, and software 423 or storage system 421 could be included in the specialized circuitry to operate processing system 420 as described herein. Storage system 421 could include a non-transitory computer-readable medium such as a disk, tape, integrated circuit, server, flash memory, phase change memory, magnetic memory, optical memory, or some other memory device, and also may be distributed among multiple memory devices.

Software 423 may include an operating system, logs, utilities, drivers, networking software, and other software typically loaded onto a computer system. Software 423 could contain application programs, video editing and configuration programs, server software, firmware, or some other form of computer-readable processing instructions. When executed by processing system 420, software 423 directs processing system 420 to operate as described herein, such as receive data for storage, store the data in segments on a storage medium with recovery headers, find the recovery headers on the storage medium, and reconstruct the data from the segments and the recovery headers, among other operations.

Storage system 421 also includes video storage 422. Video storage system 410 receives the video data as transferred by video source 450 and stores the video data on a computer-readable medium such as video storage 422. In this example, video storage 422 includes several data segments, with stored segments indicated in grey and unused or previously deleted storage space indicated in white. Video storage 422 is merely exemplary and other configurations could be shown.

User interface 430 includes equipment and circuitry for receiving user input and control, such as for receiving instructions for storing, manipulating, deleting, formatting, or recovering data, among other operations. Examples of the equipment and circuitry for receiving user input and control include a mouse, keyboard, push buttons, touch screens, selection knobs, dials, switches, actuators, keys, pointer devices, microphones, transducers, potentiometers, accelerometers, non-contact sensing circuitry, or other human-interface equipment. User interface 430 could also include a display or other indicator to communicate information to a user of video storage system 101, such as monitors, televisions, projectors, indicator lights, lamps, light-emitting diodes, or other display equipment. It should be understood that user interface 430 could comprise a network-based user interface, such as a terminal shell or other maintenance and control interface.

Bus 440 comprises a physical, logical, or virtual communication link, capable of communicating data, video information, or control signals, along with other information. In some examples, bus 440 is encapsulated within the elements of communication interface 410, processing system 420, or user interface 430, and may be a software or logical link. In other examples, bus 440 uses various communication media, such as air, space, metal, optical fiber, or some other signal propagation path, including combinations thereof. Bus 440 could be a direct link or might include various equipment, intermediate components, systems, and networks. Bus 440 could be a common link, shared link, or may be comprised of discrete, separate links.

System 400 also includes video source 450. Video source 450 illustrates an example of a device used to capture video data. Video source 450 includes lens 452, sensor 454, processor 456, memory 458, and communication interface 459. Processor 456, memory 458, and communication interface 459 each communicate over bus 442, although discrete links could be employed. Lens 452 is configured to focus an image of a scene on sensor 454. Lens 452 may be any type of lens, pinhole, zone plate, or the like able to focus an image on sensor 454. Sensor 454 then digitally captures these images and transfers them to processor 456 in the form of video. Processor 456 may store some or all of the video in memory 458 in the short term, but eventually processes the video, and sends the processed video as video data for storage through communication interface 459 and link 441. The video data could include MPEG, H.264, Flash, VP8, JPEG video, among other digital formats, and could be transferred in a packet format, such as Ethernet, IP, or other packet formats, including combinations, variations, or improvements thereof.

Figure 5:
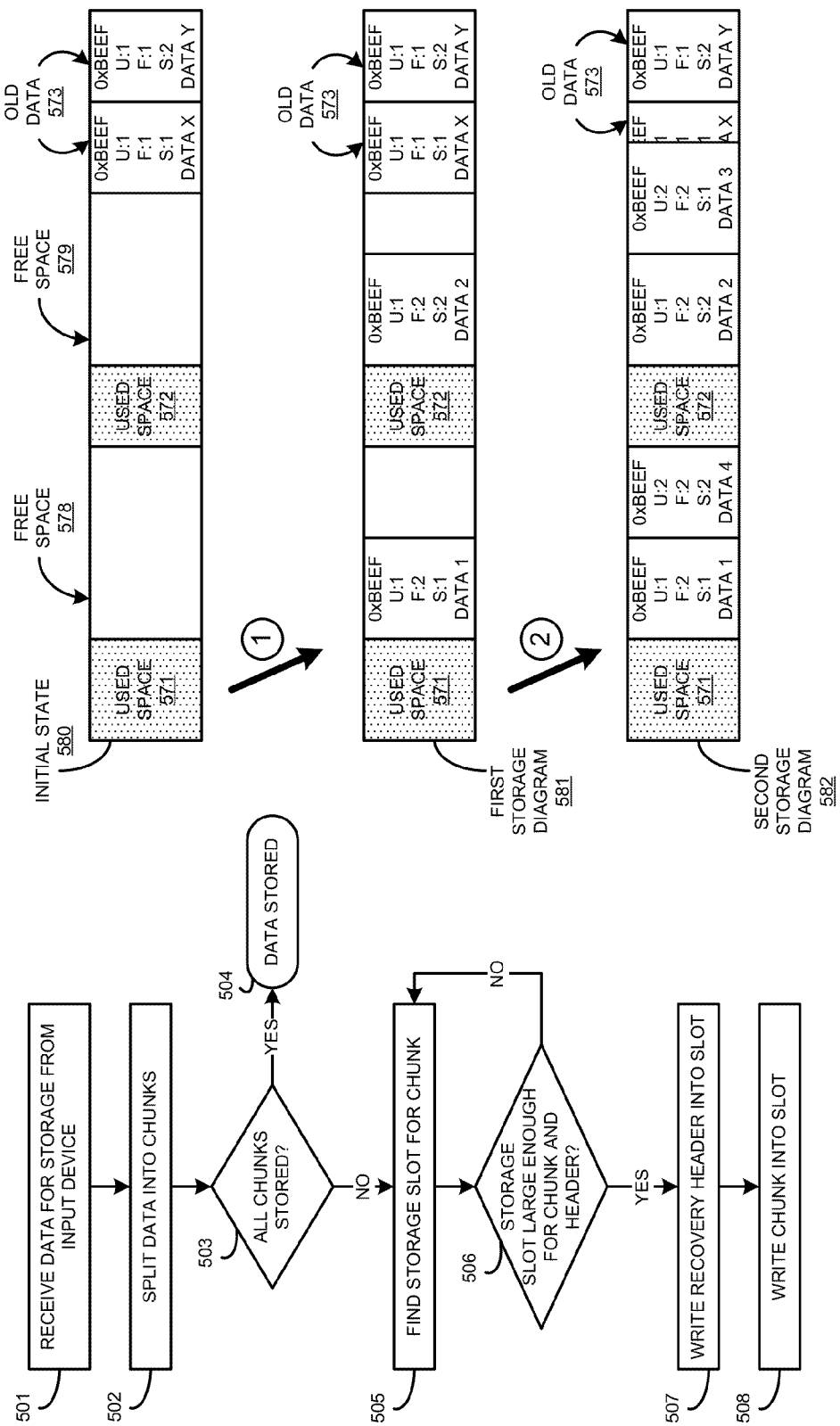
FIG. 5 is a flow diagram illustrating a method of operating a storage system; and, FIG. 6 is a flow diagram illustrating a method of operating a storage system.

FIG. 5 is a flow diagram illustrating a method of operating video storage system 401. The operations in FIG. 5 are referenced herein parenthetically. In FIG. 5, video storage system 401 receives (501) data for storage from an input device.

In this example, communication interface 410 receives video data over link 441 from video source 450. The video data could include data packets, a data file, or streaming data, among other data. Communication interface 410 transfers the video data for processing and storage over bus 440. In this example, two video data files are used for illustrative purposes. It should be understood that the operations described herein could be applied to other data formats, content, and arrangements.

Video storage system 401 splits (502) the video data files into segments. Processing system 420 could process the video data files to break the data into several pieces, or segments. In some examples, the data is received in discrete files, or data packets are combined to create a data file. The data file merely represents a collection of data, such as a document, video clip, song, or other discrete data collection. The segments of the data could be segments of the data files as received or created by video storage system 401. A size of each segment could vary. In examples where a predetermined segment size is employed, the segments could all be of the same size, except for a final segment of a data file, which could vary if the remaining data in a file—after being broken into several equal-sized segments—does not align with the preferred segment size. In other examples, the segment size could vary according to the data content of the data file. For example, if video data is used, then the segment size could be based on a time duration of the video, such as every one second of video or a predetermined number of video frames would be included in each separate segment. Variable video compression and encoding techniques may create different sized segments for various equal-time portions of the video.

If all segments of the data have been stored (503), then the process described in FIG. 5 is complete (504). However, since this is the initial pass for storing the data, then video storage system 401 finds (505) a storage slot for a first segment of the data associated with the first data file. The storage slot is found on a computer-readable medium used for storing data, which in this example includes video storage 422 on storage system 421. As shown in FIG. 5, an initial state 580 illustrates a state of video storage 422 prior to the operations of FIG. 5. In this example, initial state 580 includes two portions of used space, namely used spaces 571-572, two portions of free space, namely free spaces 578-579, and two portions of old data, namely old data 573. Used spaces 571-572 could include currently stored data, or could include operating system files, protected files, or other data portions. Free spaces 578-579 include storage location which are not currently holding data, and can be used to store new data. Old data 573 includes data segments stored from a previous storage operation which remain on video storage 422 after a previous deletion or formatting operation was performed. The previous deletion or formatting operation includes modifying a file index, such as a file allocation table, to clear a record of the data from the file index without actually modifying the data segments previously stored.

In this example, free spaces 578-579 and old data 573 could be identified as potential storage slots for new segments of data. Video storage system 401 then identifies a portion of the potential storage slots as a storage slot for the first segment of the data associated with the first data file. If the storage slot is large enough for the first segments of the data as well as an associated recovery header for the first segment, then the storage slot is selected (506). However, if the storage slot is not large enough, then a different storage slot is selected.

Video storage system 401 writes (507) the recovery header into the selected storage slot, as well as writes (508) the segment into the slot which is associated with the recovery header. The process above is repeated for each segment of each data file. As shown first storage diagram 581 in FIG. 5, the first video data file has been written as two segments with associated recovery headers. The first segment includes 'DATA 1' as the data segment portion, and preceding information as the recovery header. The recovery header information is discussed in more detail below. The second segment includes 'DATA 2' as the data segment portion, and preceding information as the recovery header. In this example, the first segment and recovery header fit into free space 578, while the second segment and recovery header fit into free space 579. Thus, the first video data file is written as two non-contiguous segments with associated recovery headers.

As shown second storage diagram 582 in FIG. 5, the second video data file has been written as two segments with associated recovery headers. The first segment includes 'DATA 3' as the data segment portion, and preceding information as the recovery header. The recovery header information is discussed in more detail below. The second segment includes 'DATA 4' as the data segment portion, and preceding information as the recovery header. In this example, the first segment and recovery header fit into free space 579, while the second segment and recovery header fit into free space 578. It should be noted that old data 573 was included in the potential storage space or storage slots for the new data, and thus the first segment of the second data file is written to as to overlap a portion of old data 573. Thus, the second video data file is written as two non-contiguous segments with associated recovery headers.

In this example, each segment of data is combined with a recovery header to form a storage packet. The recovery header is determined by video storage system 401 during the data storage process. Video storage system 401 writes a recovery header into selected slot, where the recovery header includes information associated with the first segment as well as the first data file. Information used to locate the various segments of a data file within a storage device, such as storage system 421, and link the segments back together properly to reconstruct the original data file is usually available within a file index, such as a file allocation table. In this example, recovery information is included in a recovery header stored with each data segment such that it is possible to find and link the data segments together to form the data file without any information from the file index. Thus, the method described herein makes it possible to reconstruct the data file even though a file index file is missing, destroyed, or otherwise unusable.

The recovery information includes many pieces of information, such as metadata, associated with both a single segment of data as well as with all segments for a data file. The recovery information includes, in this example, at least five different pieces of information, namely Magic identifier (ID), Object ID, Sequence Number, Chunk Size, and Error Detection Code. Each of these five elements performs a different function which is described in detail below. It should be understood that additional or different information could be included in the recovery information.

The Magic ID element is a numerical identifier used to localize a storage packet. If the file index in a storage device is not available, the storage packets are searched to locate the Magic IDs. The Magic ID value must not be too simple otherwise the chance of a random occurrence of the Magic ID sequence could be too high in the data creating false positive triggers during a search process. The Magic ID is determined as a large enough value such that it will not appear as part of the stored data or randomly, but not so large to cause unnecessarily large overhead in the storage packets. In this example, the Magic ID is '0xBEEF' as indicated in the recovery header of each storage packet in first storage diagram 581 and second storage diagram 582. The Magic ID is unique so as not to be confused with random data or data of the segments. Therefore, in this example a common Magic ID is used for all storage packets. If a second storage volume was employed, or a storage system comprising multiple filesystems, then the Magic ID could vary for each storage volume or for each filesystem.

While the Magic ID gives the ability to find the storage packets in the storage device, the Object ID offers a mechanism to identify objects within each storage packet. Using the Magic ID and the Object ID, all the storage packets needed to reconstruct an object can be found in the storage device. The Object ID must be kept unique even before and after a format of the storage device. Otherwise, confusion may occur between objects from previous and current format. The Object ID may also be comprised of two different elements. The Primary Object ID and the Format ID. The Format ID identifies indicates which data is associated with which format or wipe of the storage device. The Format ID could comprise a counter which increments every time a format of the storage device occurs. The Primary Object ID is reset to zero each time a format occurs and increases when a new object is stored. A unique Object ID could be created by combining the Primary Object ID and the Format ID. In FIG. 5, the Object ID is formed by a 'U' representing the Primary Object ID and an 'F' representing the Format ID. Thus, for the first file written, where a file corresponds to an object, the first segment has "U:1 F:2" as the Object ID, and the second segment also has "U:1 F:2" as the Object ID. The 'F' parameter indicates the new data is stored after a second formatting of the storage device has occurred, indicated by '2'. As shown with old data 573, the 'F' parameter corresponds to an earlier formatting, namely '1'. The 'U' parameter indicates the first data file is the first file written after the second formatting, namely '1'. Each segment associated with the first file will have the same 'U' and 'F' parameters in this example. For the second file written, the first segment has "U:2 F:2" as the Object ID, and the second segment also has "U:2 F:2" as the Object ID. As with the first file, the 'F' parameter indicates the new data is stored after a second formatting of the storage device has occurred, indicated by '2'. The 'U' parameter, however, indicates the second data file is the second file written after the second formatting, namely '2'.

The Sequence Number element of the recovery information provides the ability to order the storage packets within a specific object, such as to reconstruct a file from several segments. Even though all the storage packets in an object may be found using the Magic ID and Object ID header elements, the storage packets could be in a random order and their relationship to each other would need to be determined. To re-create the original object, the segments are ordered according to the Sequence Number associated with each storage packet. In FIG. 5, the sequence number is indicated by an 'S' in the recovery headers, and is incremented for each data segment of a single file, and reset for each new file. Thus, for the first data segment of the first data file, 'S' corresponds to '1' and for the second data segment of the first data file, 'S' corresponds to '2'. Likewise for the first data segment of the second data file, 'S' corresponds to '1' and for the second data segment of the second data file, 'S' corresponds to '2'.

A header element indicating the Chunk Size is also employed. In most cases, storage packets will not be contiguous in the storage device. Therefore, unused storage space which contains junk or unwanted data may immediately follow data of interest for a segment. However, without knowing the size of the data segment, it may be difficult to determine when the data segment of interest ends and when the junk data starts. Therefore, the Chunk Size element indicates the expected size of the data segment. In FIG. 5, a Chunk Size element is not shown for clarity, and instead a graphical indication of the segment sizes is indicated by a relative size of the associated box for each segment. A Chunk Size element could be included, however, which indicates a numerical size, such as in bits or bytes, of the associated segment.

An Error Detection Code is also used to ensure the data or header have not been corrupted. If there has somehow been corruption in this area of the data storage device, the recovery process may recover faulty data. The Error Detection Code could be used to detect faulty recovery headers, or to validate the recovery headers or associated data segments. In further examples, the Error Detection Code includes an error correction code, or other data correction information, to reconstruct or recover faulty portions of the data segments. For example, a cyclic redundancy check (CRC) could be performed on the data to check for faulty data. In FIG. 5, an Error Detection Code element is not shown for clarity. However, it should be understood that an Error Detection Code element could have been included. Examples of Error Detection Code include an ECC information, forward error correction (FEC) information, CRC information, checksums, or other error detection and correction code information.

In the examples above, the recovery information is stored in recovery headers which are each stored at the beginning of and contiguous with the associated data segments, to form the aforementioned storage packets. It should be understood that other physical relationships between the storage location of the recovery header information and the storage location of the data segment may exist and still fall within the scope of the invention.

Figure 6:
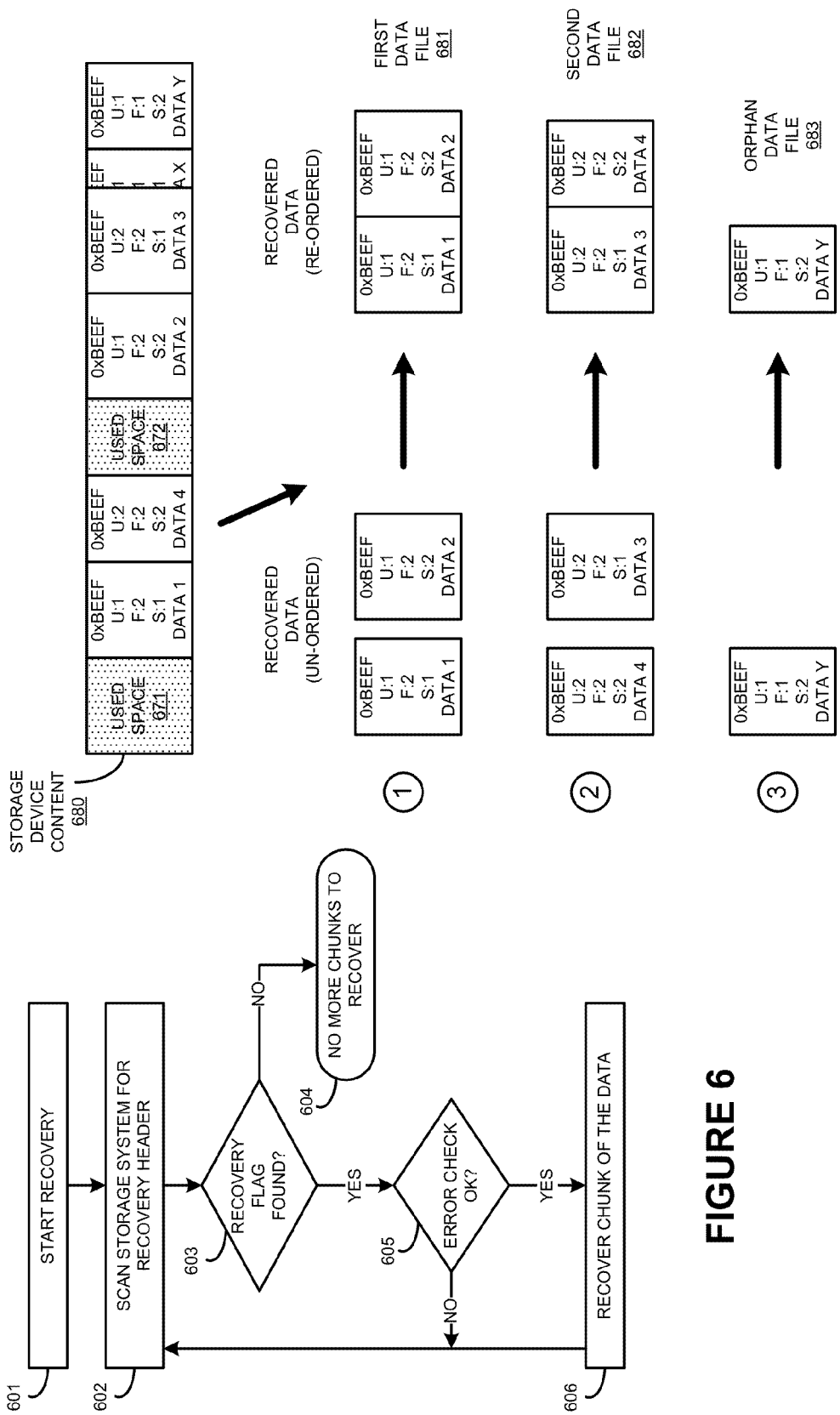

FIG. 6 is a flow diagram illustrating a method of operating video storage system 401. The operations in FIG. 6 are referenced herein parenthetically. In FIG. 6, a recovery is performed in response to a formatting of a computer-readable storage medium, such as video storage 422 of FIG. 4. Other examples include a recovery in response to a corruption, loss, unavailability of a file index associated with a computer-readable storage medium. Video storage system 401 thus starts the recovery (601) and scans (602) the associated storage system or computer-readable medium for recovery headers associated with data segments previously stored thereon. The scan operation could be performed by reading the entire computer-readable storage medium and searching for recovery flags associated with recovery headers stored thereon. The recovery flags in this example include the Magic IDs, although other recovery flags could be employed. In other examples, only a portion of the computer-readable storage medium is scanned, such as an undamaged portion to discover the recovery headers of associated recovery flags.

If no recovery flags are found (603) then no data segments are found (604), and the process terminates. However, if a recovery flag is found, then the recovery header and associated data segment is read or retrieved from the computer-readable storage medium, and an error check is performed (605). The error check determines if the recovery header or associated data segment has been damaged, is faulty, or otherwise has corrupted data associated therewith. Various error checking could be performed to validate the associated storage packet portions, such as a CRC, ECC operation, or other error detection methods discussed herein. Additionally, if faulty data is found, then an error correction process could occur to attempt to repair the faulty data. If the error check fails, then the recovery header or the associated data segment is assumed to be unrecoverable, and the process continues by looking for further recovery flags on the computer-readable storage medium. However, if the error check succeeds, then the segment of data associated with the recovery flag and recovery header is recovered. Further segments are then scanned for on the computer-readable storage medium. In some examples, the error check is only performed on the recovery header and not the data segment. For example, errors in the data segments may not be critical to data segment recovery, whereas errors in the recovery header could be more sensitive to data segment recovery. Also, in this example, a file index, such as a file allocation table, is not processed or referenced when scanning for the recovery flags or headers, or to retrieve the headers and segments from the computer-readable storage medium.

FIG. 6 shows storage device content 680 as a present state of the computer-readable storage medium used to store data segments, such as that used in FIG. 5. Storage device content 680 includes five data segments and associated recovery headers, and these are indicated below storage device content 680 in FIG. 6. The recovered data segments and associated recovery headers are then grouped into three groups, each group associated with a potential data object, such as a data file. The first potential data object is indicated by the '1' and includes two data segments namely 'DATA 1' and 'DATA 2'. The second potential data object is indicated by the 2' and includes two data segments, namely 'DATA 4' and 'DATA 3'. The third potential data object is indicated by the '3' and includes one data segment, namely 'DATA Y'. These recovered data segments, although associated with a potential data object, are not yet ordered.

The recovered data segments are identified on the computer-readable storage medium by scanning for the '0xBEEF' Magic ID. Then the associated recovery header information is found along with a potential data segment. A size indicator, such as a Segment Size element, included in the recovery header indicates how many data bits or bytes are to be included in the potential data segment. Additionally, each recovery header has an Object ID to indicate with which file or object the segment or segments are associated, and thus the five recovered segments are organized according to this Object ID, once found using the Magic ID. Although a first segment of the old data 573 indicated in FIG. 5 is partially included in storage device content 680, this partial segment does not meet the scan threshold, namely the Magic ID is not complete and thus the recovery flag and header are not found, even though a second segment of the old data 573 is found.

The recovered data segments are then reassembled by reordering into data objects, such as files. In potential data object '1', the Sequence Number elements of the recovery headers are used to order the data segments into first data file 681. In potential data object '2', the Sequence Number elements are used to order the data segments into second data file 682. However, in potential data object '3', the single data segment does not include all the segments of a complete data object, as indicated by the non-contiguous Sequence Number. Thus, orphan data file 683 is determined. Since the data segment associated with orphan data file 683 is also associated with a previous formatting of the computer-readable medium, the data segment may be ignored. In other examples, the orphan data segment may be recovered and analyzed for useful data as a partial file.

In the examples above, a storage slots is located before a storage packet is transferred to a storage device for subsequent storage thereon. To locate storage slot, a storage device, such as a hard disk drive, could locate a storage slot comprising a contiguous portion of usable space on the storage medium, and report an identifier of the contiguous portion to a storage processing system. The identifier could include an address, block identifier, or other storage location identifier. Free storage slot location is used to ensure a storage packet is not further broken or fragmented into pieces once transferred for storage on a storage medium. Thus, cooperation with a storage medium or storage medium controller portion of a storage device may be needed to properly locate free storage slots for storage packets.

In further examples, the operation of locating free storage slots could be avoided. In examples of some storage devices, a storage medium is addressable in predetermined and fixed portions, such as blocks. In some examples, the blocks are a minimum addressable size of storage units for a storage medium. The storage packets described herein could be sized according to the block size of the storage medium, or another predetermined size. Thus, the data objects or data files are broken up or split into predetermined sizes based on the block sizes for the storage medium. In this manner, discovery of storage slots with enough contiguous free space for a storage packet may not be necessary, as the storage packets would be sized according to the block sizes, and thus would not be further broken or fragmented up by a storage medium controller or storage medium when stored thereon.

Although the descriptions, embodiments, and figures discussed herein provide examples of using the invention with video files, it should be understood that the systems and methods provided for storing and recovering data will work equally well for many other types of computer files and data files. As a result, the invention is not limited to use with video data or video files.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a storage system, the method comprising:
    splitting a video data file into a plurality of data segments;
    generating a plurality of recovery headers for the recovery of the data segments located at non-contiguous locations;
    combining ones of the recovery headers with ones of the data segments to form a plurality of storage packets for storage on a storage device; wherein two or more data segments and recovery headers from the same video data file are stored on the storage device non-contiguously, wherein the recovery headers comprise data segment recovery information that is stored with each data segment such that it is possible to find and link the data segments together from the non-contiguous locations to reconstruct the video data file without any information from a file index; and
    performing an error check of recovery headers to determine if the recovery header has been damaged, is faulty, or otherwise has corrupted data associated therewith.

2. The method of claim 1, further comprising:
    locating empty slots on the storage device for the storage packets, and storing the storage packets in the empty slots.

3. The method of claim 2, further comprising:
scanning the storage device for recovery flags associated with the recovery headers; and
retrieving the storage packets from the storage device based on the recovery flags.

4. The method of claim 3, wherein the storage system does not process a file index to scan the storage device for the recovery flags and retrieve the storage packets from the storage device.

5. The method of claim 3, further comprising:
identifying the data segments from the storage packets; and
reconstructing the video data file from the data segments based on the recovery headers associated with the data segments.

6. The method of claim 3, wherein reconstructing the video data file from the data segments comprises ordering the data segments based on the recovery headers.

7. The method of claim 3, further comprising:
processing error checking information included in the recovery headers to validate the recovery headers.

8. The method of claim 1, wherein the recovery header comprises at least Magic identifier (ID), Object ID, Sequence Number, and Chunk Size elements.

9. The method of claim 1, wherein splitting the video data file into the plurality of data segments comprises splitting the video data file into the plurality of data segments based on video data content of the video data file.

10. A non-transitory computer-readable medium having program instructions stored thereon for operating a storage system, that when executed by the storage system, direct the storage system to:
split a video data file into a plurality of data segments, generate a plurality of recovery headers for the recovery of the data segments located at non-contiguous locations, and combine ones of the recovery headers with ones of the data segments to form a plurality of storage packets; wherein two or more data segments and recovery headers from the same video data file are stored on the storage device non-contiguously; and
perform an error check of recovery headers to determine if the recovery header has been damaged, is faulty, or otherwise has corrupted data associated therewith; and,
locate empty slots on a storage device for the storage packets, and store the storage packets in the empty slots, wherein the recovery headers comprise data segment recovery information that is stored with each data segment such that it is possible to find and link the data segments together from the non-contiguous locations to reconstruct the video data file without any information from a file index.

11. The computer-readable medium of claim 10 having further program instructions stored thereon to direct the storage system to:
scan the storage device for recovery flags associated with the recovery headers; and
retrieve the storage packets from the storage device based on the recovery flags.

12. The computer-readable medium of claim 11, wherein the storage system does not process a file index to scan the storage device for the recovery flags and retrieve the storage packets from the storage device.

13. The computer-readable medium of claim 11 having further program instructions stored thereon to direct the storage system to:
identify the data segments from the storage packets; and
reconstruct the video data file from the data segments based on the recovery headers associated with the data segments.

14. The computer-readable medium of claim 11, wherein the storage system is configured to order the data segments based on the recovery headers to reconstruct the video data file.

15. The computer-readable medium of claim 11 having further program instructions stored thereon to direct the storage system to:
process error checking information included in the recovery headers to validate the data segments.

16. The computer-readable medium of claim 10, wherein the recovery header comprises at least Magic identifier (ID), Object ID, Sequence Number, and Chunk Size elements.

17. The computer-readable medium of claim 10, wherein the storage system is configured to split the video data file into the plurality of data segments based on a predetermined segment size.

18. The computer-readable medium of claim 10, wherein the storage system is configured to split the video data file into the plurality of data segments based on video data content of the video data file.

19. A storage system comprising:
a processing system configured to split a video data file into a plurality of data segments, generate a plurality of recovery headers for recovery of the data segments located at non-contiguous locations, and combine ones of the recovery headers with ones of the data segments to form a plurality of storage packets, and locate empty slots on a storage device for the storage packets; wherein two or more data segments and recovery headers from the same video data file are stored on the storage device non-contiguously, and perform an error check of recovery headers to determine if the recovery header has been damaged, is faulty, or otherwise has corrupted data associated therewith; and
the storage device configured to store the storage packets in the empty slots, wherein the recovery headers comprise data segment recovery information that is stored with each data segment such that it is possible to find and link the data segments together from the non-contiguous locations to reconstruct the video data file without any information from a file index.

20. The storage system of claim 19 comprising:
the processing system configured to scan the storage device for recovery flags associated with the recovery headers, and retrieve the storage packets from the storage device based on the recovery flags.

* * * * *